(12) United States Patent
Delvaux et al.

(10) Patent No.: US 6,254,810 B1
(45) Date of Patent: Jul. 3, 2001

(54) METHOD FOR COATING PROFECTING AND RIGIDIFYING A FABRIC MADE OF HEAT-RESISTANT FIBERS

(75) Inventors: Pierre Delvaux, Bromptonville; Luc Desrosiers, Rock Forest; Marcel Gouin, Deauville; Michel Rouleau, Eastman, all of (CA)

(73) Assignee: Cerminco Inc., Sherbrooke (CA)

( * ) Notice: Subject to any disclaimer, the term of this patent is extended or adjusted under 35 U.S.C. 154(b) by 0 days.

(21) Appl. No.: 09/020,847

(22) Filed: Feb. 9, 1998

(51) Int. Cl.[7] ............... B29C 41/20; B29C 51/02
(52) U.S. Cl. ............ 264/29.1; 264/137; 264/234; 264/257; 264/301; 264/322; 442/136; 442/180; 210/507; 210/509; 210/510.1
(58) Field of Search ................ 264/301, 136, 264/137, 134, 257, 322, 344, 29.1, 29.7, 234; 427/348, 434.3, 228, 244, 407.3, 419.1; 210/639, 507, 510, 506, 509, 510.1; 442/136

(56) References Cited

U.S. PATENT DOCUMENTS

| | | | | |
|---|---|---|---|---|
| 2,289,339 | * | 7/1942 | Brennan | 427/348 |
| 2,995,453 | | 8/1961 | Nobel et al. | 106/39 |
| 3,063,868 | * | 11/1962 | Brandsma et al. | 427/348 |
| 3,235,401 | * | 2/1966 | Fowells et al. | 427/348 |
| 3,385,914 | * | 5/1968 | Hindersinn et al. | 260/944 |
| 3,766,000 | * | 10/1973 | Gibson et al. | 161/170 |
| 4,202,946 | * | 5/1980 | Smith et al. | 521/169 |
| 4,367,295 | * | 1/1983 | Von Bonin | 521/165 |
| 4,380,593 | * | 4/1983 | Von Bonin | 521/163 |
| 4,472,461 | * | 9/1984 | Johnson | 427/348 |
| 4,507,355 | * | 3/1985 | George et al. | 428/246 |
| 4,529,742 | * | 7/1985 | Von Bonin | 521/107 |
| 4,631,224 | | 12/1986 | George et al. | 428/246 |
| 4,752,506 | * | 6/1988 | Wingert | 427/348 |
| 4,774,106 | * | 9/1988 | Kozono | 427/348 |
| 4,857,364 | * | 8/1989 | Von Bonin | 427/255 |
| 4,897,294 | * | 1/1990 | Libby et al. | 264/344 |
| 5,124,040 | * | 6/1992 | Hitchings | 210/639 |
| 5,322,729 | * | 6/1994 | Heeter et al. | 427/348 |
| 5,635,201 | * | 6/1997 | Fabo | 427/348 |

\* cited by examiner

*Primary Examiner*—Jan H. Silbaugh
*Assistant Examiner*—Edmund H. Lee
(74) *Attorney, Agent, or Firm*—Foley & Lardner

(57) ABSTRACT

One may obtain an excellent protective coating for a fabric made of heat-resistant fibers, in particular a fabric made of glass fibers like those used for the manufacture of filters in the metallurgical industry, when use is made, as a starting material, of a composition comprising an organic part made of sugar and a mineral part comprising colloidal silica and wollastonite. This composition allows thermoforming of the fabric and gives to the same a very strong protection and a rigidity. This is particularly interesting when the fabric is used for making a filter like those used during the casting of a liquid metal, especially liquid aluminum.

9 Claims, No Drawings

METHOD FOR COATING PROFECTING AND RIGIDIFYING A FABRIC MADE OF HEAT-RESISTANT FIBERS

FIELD OF THE INVENTION

The present invention relates to a thermoformed mineral composition that can be used for coating, protecting and rigidifying a fabric made of heat-resistant fibers, such as a fabric made of glass fibers or silica fibers.

The invention also relates to a method for coating, protecting and rigidifying a fabric made of heat resistant fibers with the above mentioned composition.

The invention further relates to the fabric which is obtained by the above method and is provided with a protecting and rigidifying coating. Such a fabric is particularly useful for the manufacture of filters for the casting of the molten metals, especially aluminum.

BRIEF DESCRIPTION OF THE PRIOR ART

It has already been suggested to apply a protective coating onto a fabric made of fibers. This method is commonly used in the metallurgical industry for protecting the filters that are made of glass fiber fabrics and are used during the casting of a liquid metal, such as aluminum.

U.S. Pat. No. 5,124,040 issued in 1992 in the name of Jay R. HITCHINGS discloses a process for making a refractory filter for the casting of liquid ferrous and non-ferrous metal. In this process, a carbon-based resin is 25 deposited on the surface of a fabric made of glass fibers. The deposition is preferably achieved by dipping the fabric into the resin which is preferably a phenolformaldehyde resin. The dipped fabric is then heated at a temperature of about 300° C. for a period of three to five minutes. This heating or "curing" forms a coating made of "char", which protects the fabric. It is worth mentioning that, on page 3, lines 45 to 50 of this patent, cellulose, phenolics and sugar are described as being "excellent examples of polymers which form strong, porous chars".

An example of carbon-based resins that is commonly used as a coating for the manufacture of a refractory filter is the phenolic resin of the type sold by BAKELITE under the trademark RÜTAPHEN®.

According to a classification established by Leo H. BAEKELAND, the condensation of phenolic resins of the BAKELITE type is achieved in three steps.

The first step or "initial condensation" is called "A-stage" or resol. The resin obtained after this initial condensation comprises mainly an alcohol phenol or methylol. The resin at this stage is still in a thermoplastic state and soluble into organic solvents.

The second step is called "B-stage" or resitol. This stage corresponds to a condensation degree where the molecular weight has increased to such a level that the fluidity is decreased. Very few reticulations have occurred yet. The obtained resin, when it is hot, is soft and fusible. However, when it is cold, the resin is hard and brittle.

The third step is called "C-stage" or resite. This step is the final polymerization step. Most of the reticulations are completed and the resin becomes insoluble and non-fusible.

In practice, the fabric made of a glass fibers and impregnated with a phenolic resin can be processed to the intermediary B-stage. Subsequently, it can be processed to the final C-stage when it is processed by thermosetting.

It is also known in the industry to use coatings that are of the mineral type instead of the organic type, for the protection of fabrics made of glass fibers. By way of example of such a coating, reference can be made to U.S. Pat. No. 2,995,453 issued in 1961 to Richard B. NOBEL et al, which discloses the use of a coating made of colloidal silica.

The colloidal silicas that can be used for this purpose, are for example, those sold by DuPONT NEMOURS under the trademark LUDOX®.

It is further known in the industry to use coatings that include an organic part and a mineral part, for the protection of filters made of fabrics made of glass fibers. In this connection, reference can be made to U.S. Pat. No. 4,631,224 of 1986 in the name of Stephen GEORGE et al, which discloses the use a coating consisting of an aqueous suspension containing, on the one hand, colloidal silica, aluminium phosphate and aluminium chlorhydrate and, on the other hand, a phenolic or urea-formaldehyde resin.

SUMMARY OF THE INVENTION

It has now been discovered that one may obtain an excellent protective coating for a fabric made of heat-resistant fibers, in particular a fabric made of glass fibers like those used for the manufacture of filters in the metallurgical industry, when use is made, as a starting material, of a composition comprising an organic part made of sugar and a mineral part comprising colloidal silica and wollastonite. This composition allows thermoformed of the fabric and gives to the same a very strong protection and a rigidity. This is particularly interesting when the fabric is used for making a filter like those used in the metallurgy industry during the casting of a liquid metal, especially liquid aluminum.

Thus, a first object of the present invention is to provide a composition for coating, protecting and rigidifying a fabric made of heat-resistant fibers, this composition consisting of an aqueous suspension of wollastonite, colloidal silica and sugar having a sufficient viscosity to cover the fibers of the fabric while avoiding obturating the free spaces between these fibers.

Preferably, the composition is formulated in such a manner that the suspension contains from 30 to 50% by weight of solids;

the colloidal silica and wollastonite are present in a weight ratio of colloidal silica to wollastonite ranging from 0.5 to 1.2; and the sugar amounts to at least 25% by weight of the suspension and is present in a weight ratio of sugar to wollastonite+colloidal silica+sugar ranging from 0.55 to 1.0.

A second object of the invention is to provide a method for coating, protecting and rigidifying a fabric made of heat-resistant fibers, comprising the steps of:

a) preparing an aqueous suspension of wollastonite, colloidal silica sugar and water and having a sufficient viscosity to cover the fibers of the fabric while avoiding obturating the free spaces between said fibers, this suspension having a mineral part and an organic part;

b) depositing the suspension prepared in step a) onto the fabric in order to impregnate the fibers of said fabric, and then eliminating any excess of said suspension to avoid obturating in the free spaces between the fibers of the fabric;

c) drying the fabric obtained in step b) at a temperature ranging from 130 to 160° C.;

d) giving a requested form to the dried fabric obtained in step c) by submitting said fabric to a thermoformed treatment at a softening temperature ranging from 160 to 200° C.; and e) subjecting the thermoset fabric obtained in step d) to a thermal treatment at a temperature above 200° C. and up to 400° C. in order to convert the organic part of the suspension into polymeric carbon and/or to fully eliminate this organic part.

A third object of the invention is to provide a fabric made of heat-resistant fibers and comprising a protective and rigidifying coating, such a fabric being obtained by the method disclosed hereinabove.

The invention and its advantages will be better understood upon reading the following non-restrictive detailed description thereof.

DETAILED DESCRIPTION OF THE INVENTION

As explained hereinabove, the invention is essentially concerned with the coating, protection and rigidification of a fabric made of heat-resistant fibers. Preferably, the fabric is made of glass fibers. However, the invention could also be used with any other kind of fabric, depending on the intended use of this fabric.

The first step (a) to be carried out in order to obtain the requested coating consists in preparing the composition intended to be applied to the fibers of the fabric. This composition consists of an aqueous suspension of wollastonite, colloidal silica and sugar having a sufficient viscosity to cover the fibers of the fabric while avoiding obturating the free spaces between these fibers.

As it can be understood, the suspension has, due to its formulation, a mineral part and an organic part.

The respective amounts of the ingredients that are present in the suspension are selected in order to meet the following criteria.

First of all, the suspension must have a sufficient viscosity to cover the fibers while avoiding obturating of the free spaces of the fabric. For this purpose, the total amount of solids within the suspension should preferably range between 30 and 50% by weight.

Secondly, the weigh ratio of colloidal silica to wollastonite should preferably be selected in such a manner that the obtained suspension has a life span of about 10 hours and provides a maximum reinforcement. This weight ratio of colloidal silica wollastonite may vary from 0.5 to 1.2.

Thirdly, the minimal amount of sugar should preferably be 25% by weight with respect to the total weight of the suspension, so that the "B-stage" fabric (see the following description) be easy to handle without generating dust, and have the requested rigidity. The weight ratio of sugar to the total amount of colloidal silica, wollastonite and sugar should preferably range between 0.55 and 1.0.

The colloidal silica that is used is preferably the one sold by DUPONT de NEMOURS under the trademark LUDOX CL-P®. This colloidal silica contains 30% of solids in suspension in water. Other colloidal silicas could also be used, provided that they do not affect the requested viscosity of the suspension.

The wollastonite that is used should have the smallest possible granulometry possible, inasmuch as it is intended to be used as a coating onto fibers. Preferably, use should be made of the wollastonite sold by NYCO under the commercial tradename wollastonite 1250.

The sugar that is used, is a fine sugar as it can be found in any food store.

To prepare the suspension, the wollastonite, sugar and water are preferably mixed first in a HOBARD® mixer for 5 min. The colloidal silica (preferably LUDOX CL-P®) is then added and the mixture is homogenized for 5 min. The suspension of colloidal silica and wollastonite in the sugar solution is then ready to be used. Its life span is about without 10 h. A slight stirring should be maintained in order to avoid sedimentation problems.

The second step (b) of the method according to the invention consists in depositing the suspension prepared in step (a) onto the fabric in order to impregnate the fibers of the same, and then to remove the excess of suspension in order to avoid obturating the free spaces of the fabric. Preferably, the suspension is deposited by dipping the fabric into the suspension and the excess of suspension is removed by a light compressed air blow. Of course, the disposition could be made by other methods, such as projection or any direct application. Similarly, the excess of suspension could alternatively be removed by shaking the fabric or by any other means.

The third step (c) consists in drying the impregnated fabric obtained in step (b).This drying must be carried out at a temperature lower than the melting temperature of the sugar. Thus, the drying steps should be carried out at a temperature ranging of from 130 to 160° C. for a sufficient period of time to obtain the requested drying. The obtained product corresponds, from a "structural" standpoint, to the one obtained during the "B-stage" mentioned hereinabove in the preamble of the present description.

The fourth step (d) consists in giving a requested shape or form to the dried fabric obtained step (c) by subjecting it to a thermoformed treatment at a softening temperature ranging between 160 and 200° C. The thermoformed treatment of step (d) can be static. In such a case, it consists in depositing the fabric onto a piece having a desired shape and then heating it. Alternatively, the thermoformed treatment of step (d) can be dynamic. In such a case, it consists in inserting the fabric between two pieces of a mold and to press the fabric between the pieces while heating it.

In all cases, it is compulsory that the thermoformed treatment be carried out at a temperature that does not exceed 200° C. Indeed, under this temperature, the fabric may still be formed and unformed in a relatively easy manner for 2 to 3 times. Above this temperature, the fabric is set and cannot be formed again.

Last of all, the fifth and last step (e) of the method according to the invention consists in subjecting to a thermal treatment the thermoformed fabric obtained in step (d) in order to transform the organic part of the suspension to polymeric carbon and/or to completely eliminate this organic part if, in some particular application, no organic part is tolerated. The thermal treatment can be carried out at a temperature above 200° C. and up to 400° C.

Preferably, this thermal treatment is carried out in a furnace in one or two steps. The first step can be carried out at, for example, 325° C. The fabric which is so obtained corresponds to the one obtained during the "C-stage" mentioned in the preamble of the present description. If all the polymeric carbon that is formed is to be eliminated, the product must then be subjected to a second thermal treatment (or post-treatment) at a temperature of, for example, 400° C. Then, the organic part of the suspension is completely eliminated. This type of post-treatment is particularly interesting when the fabric is intended to be used as a filter for a molten, ferrous or non-ferrous metal, especially when one wants to avoid the apparition of flames or fumes at the first contact between the molted metal and the filter.

While the above steps are carried out, the rigidity and fire loss of the fabric vary in a substantial manner. This will be better emphasized in the following examples, which show how the invention that can be used for the manufacture of fabrics which have a low amount of organic material and can easily be thermoformed.

EXAMPLE 1

An aqueous suspension of wollastonite, colloidal silica and sugar was prepared in order to provide a protecting and rigidifying coating on a fabric made of glass fibers.

The composition of the suspension that was so prepared is given in the following Table I.

TABLE I

COMPOSITION OF THE SUSPENSION

| Ingredients | Parts by weight |
| --- | --- |
| Ludox CL-P | 6.8 |
| Wollastonite 1250 | 6.2 |
| Sugar | 35.2 |
| $H_2O$ | 51.8 |

1'×1' pieces of the fabric made of glass fibers were dipped into the above mentioned suspension. This fabric was a fabric made of glass fibers of type E sold by PYROTEK INC under the tradename 36L. The excess of suspension was removed by a light compressed air blow in order to avoid the obturation of the free spaces of the fabric by the suspension.

The so-impregnated fabric was then dried at 150° C. for 10 minutes. The fabric obtained after is drying hereinafter designated "B-stage" fabric.

Samples of 6"×6" of the B-stage fabric were cut and laid onto a metal crown having an external diameter of 4.50" and an internal diameter of 3.50". A 100 g weight was then deposited in the middle of every sample of the fabric and the deflection of the same was measured by a micrometer. This deflection is expressed in centimeters and is indicative of the rigidity of the fabric, it being understood that the lower is the deflection, the higher is the rigidity of the fabric.

Under the above mentioned measurement conditions, the evolution in time of the rigidity of the B-stage fabric obtained as disclosed hereinabove was measured for a period of 4 months. The obtained results are given in Table II hereinafter. During these tests, the samples of fabric were left in the ambient condition of the measurement room.

TABLE II

EVOLUTION IN TIME OF THE RIGIDITY OF THE FABRIC

| Time (expressed in days) | Deflection (expressed in cm) |
| --- | --- |
| 1 | 0.12 |
| 7 | 0.11 |
| 30 | 0.12 |
| 60 | 0.11 |
| 120 | 0.11 |

It is known that a fabric of such a rigidity can be rolled up at the outlet of a loom and is easier to cut, stamp and/or assemble. As a matter of fact, the elementary plies made of the fabric yards are sufficiently glued to each other and the fabric is easy to cut thereby making it very useful for automated handling.

It is worth mentioning that the B-stage fabrics made from phenolic resin that are presently available on the market, are soft fabrics. These fabrics do not have the rigidity of the fabric obtained by the method according to the invention and cannot therefore be used in the very same manner in an automated system.

The stage-B fabric that was obtained as disclosed hereinabove was then subjected to a thermoformed treatment in order to give it a desired form. The thermoformed treatment was carried out in a static manner at a temperature about of 180° C.

Last of all, the fabric was subjected to a thermal treatment carried out in two steps in a furnace. The first treatment was carried out at 325° C. for up to 6.6 min. and it converted the fabric into a C-stage fabric. The second treatment (or post-treatment) carried out at 400° C. for 10 minutes.

Table III hereinafter gives the evolution of the rigidity and fire loss of the fabric as a function of the thermoformed and/or thermal treatment(s) carried out onto the same.

As can be seen, the B-stage fabric disclosed hereinabove had a deflection of 0.12 cm and a fire loss of 16%. The C-stage fabric obtained after a thermal treatment of 1.6 min. at 325° C. had a deflection of 0.13 cm and a fire loss of 7.1%. After a subsequent thermal treatment at 325° C. for 5 additional minutes, its deflection was still 0.12% and its fire loss was 7.0%. After a post-treatment carried out at 400° C. for 10 minutes, the deflection increased to 0.65 cm and the fire loss dropped to 0.2.

TABLE III

EVOLUTION OF THE RIGIDITY AND FIRE LOSS OF FABRICS AFTER DIFFERENT THERMOSETTING AND THERMAL TREATMENTS

| Treatment of the fabrics | | Deflection (expressed in cm) | Fire loss (expressed in %) |
| --- | --- | --- | --- |
| "B-stage" | | 0.12 | 16.0 |
| "C-stage" | 1.6 minutes at 325° C. | 0.13 | 7.1 |
| | 5.0 minutes at 325° C. | 0.12 | 7.0 |
| Post-treatment | 10.0 minutes at 400° C. | 0.65 | 0.2 |

EXAMPLE 2

136 kg of a coating suspension was prepared by mixing 80.4 kg of water, 35.4 kg of sugar and 9.6 kg of wollastonite 1250 into a Hobart® mixture of 5 minutes. Then, 10.6 kg of colloidal silica of trademark LUDOX CL-P® was added and the resulting mixture was homogenized for 5 minutes.

The obtained suspension was poured into an impregnation tank positioned between a loom in which a fabric was manufactured and a drying tunnel. The loom had a width of about 2 m. Its speed was about 21' per min.

The fabric that was manufactured in the loom was of the type 36L made of glass fiber of type E.

The condition of thermal treatment within the drying tunnel was 125° C. in a first zone and 150° C. in a second zone. The resilient time within the furnace was 6 min. into the first zone and 6 min. into the second zone. The B-stage fabric that was so-obtained, had an excellent uniformity and a suitable rigidity.

From the B-stage fabric that was so prepared, filters for molten aluminum were prepared. These filters were half-spheric in shape and had a radius of 6". Flat pieces of the fabric previously cut in order to form the requested half-spheres were deposited onto the male part of a mold at a temperature of 195° C. At this temperature, the fabric took the desired form by mere gravity.

The female part of the mold was then moved down. This female of part had a temperature of 325° C. A pressing was carried out for 2 min. and provided a final thermosetting of the fabric while converting it into a C-stage fabric.

EXAMPLE 3

From the B-stage fabric prepared as disclosed in example 2, other filters for molten aluminum were prepared.

Different thermal treatments were carried out to completely eliminate the apparition of flames and fumes when the fabric was put into contact with molten aluminum. Tests were carried out for this purpose. These tests consisted in deposited samples of 2"×2" of the fabric disclosed hereinabove onto molten aluminum at different temperature, and to observe visually the eventual apparition of flames and fumes. Table IV hereinafter gives the results of such observations.

TABLE IV

APPARITION OF FLAMES AND FUMES ON FABRICS HAVING BEEN SUBJECTED TO DIFFERENT THERMAL TREATMENTS

| Thermal treatment | Temperature of the molten aluminum ° C. | | | | | |
|---|---|---|---|---|---|---|
| | 725–730 | | 780–790 | | 800–810 | |
| | flames | fumes | flames | fumes | flames | fumes |
| "B-stage" | yes | yes | yes | yes | yes | yes |
| 1.6 minutes at 325° C. | no | no | no | no | yes | yes |
| 1.6 minutes at 400° C. | no | no | no | no | yes | yes |
| 5.0 minutes at 400° C. | no | no | no | no | no | no |

What is claimed is:

1. A method for coating, protecting and rigidifying a fabric made of heat-resistant fibers, comprising the steps of:
   a) preparing an aqueous suspension of wollastonite, colloidal silica, sugar and water and having a sufficient viscosity to cover the fibers of the fabric while avoiding obturating free spaces between said fibers, said suspension having a mineral part and an organic part;
   b) depositing the suspension prepared in step a) onto the fabric to impregnate the fibers of said fabric, and eliminating any excess of said suspension to avoid obturating the free spaces between the fibers of the fabric;
   c) drying the fabric obtained in step b) at a temperature ranging from 130 to 160° C., wherein the temperature is lower than the melting temperature of the sugar;
   d) giving a form to the dried fabric obtained in step c) by submitting said fabric to a thermoforming treatment at a softening temperature ranging from 160 to 200° C.; and
   e) subjecting the thermoformed fabric obtained in step d) to a thermal treatment at a temperature above 200° C. and up to 400° C. in order to convert the organic part of the suspension into polymeric carbon and/or to fully eliminate said organic part.

2. The method according to claim 1, wherein
   the suspension contains from 30 to 50% by weight of solids;
   the colloidal silica and the wollastonite are present in a weight ratio of the colloidal silica to the wollastonite ranging from 0.5 to 1.2; and
   the sugar amounts to at least 25% by weight of the suspension and is present in a weight ratio of the sugar to the wollastonite+the colloidal silica+the sugar ranging from 0.55 to 1.0.

3. The method according to claim 2, wherein, in step b):
   the supersion is deposited by dipping the fabric into the suspension; and
   the excess of said suspension is removed by a light, compressed air blow.

4. The method according to claim 3, wherein the thermoforming treatment of step d) consists of depositing the fabric onto a mold having a desired form, and then heating said fabric at said softening temperature.

5. The method of claim 3, wherein the thermal treatment of step e) is carried out in a furnace and comprises two steps each carried out at a different temperature to first convert the organic part of the suspension into polymeric carbon and then to eliminate said polymeric carbon.

6. The method of claim 2, wherein the fibers of the fabric consist of glass fibers.

7. The method of claim 5, wherein the fibers of the fabric consists of glass fibers.

8. The method according to claim 1, wherein the aqueous suspension consists essentially of wollastonite, colloidal silica, sugar and water.

9. The method according to claim 3, wherein the thermoforming treatment of step d) consists of inserting the fabric between two pieces of a mold and pressing said fabric between said two pieces of the mold while heating said two pieces of the mold.

* * * * *

UNITED STATES PATENT AND TRADEMARK OFFICE
CERTIFICATE OF CORRECTION

PATENT NO. : 6,254,810 B1  Page 1 of 1
DATED : July 3, 2001
INVENTOR(S) : Pierre Delvaux et al.

It is certified that error appears in the above-identified patent and that said Letters Patent is hereby corrected as shown below:

Title page,
Item [54], should read as follows:
-- [54] THERMOFORMED MINERAL COATING FOR REFRACTORY FABRICS AND USE THEREOF. --

Signed and Sealed this

Thirtieth Day of April, 2002

*Attest:*

JAMES E. ROGAN
*Attesting Officer*     *Director of the United States Patent and Trademark Office*